US 11,145,332 B2

(12) United States Patent
Volvovski et al.

(10) Patent No.: US 11,145,332 B2
(45) Date of Patent: Oct. 12, 2021

(54) PROACTIVELY REFRESHING STORAGE ZONES WITHIN A STORAGE DEVICE

(71) Applicant: INTERNATIONAL BUSINESS MACHINES CORPORATION, Armonk, NY (US)

(72) Inventors: Ilya Volvovski, Chicago, IL (US); Praveen Viraraghavan, Chicago, IL (US); Jordan Harrison Williams, Chicago, IL (US); Benjamin Lee Martin, Gatesville, TX (US); Manish Motwani, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/809,854

(22) Filed: Mar. 5, 2020

(65) Prior Publication Data
US 2021/0280217 A1 Sep. 9, 2021

(51) Int. Cl.
*G11B 5/09* (2006.01)
*G11B 20/18* (2006.01)
*G06Q 20/12* (2012.01)

(52) U.S. Cl.
CPC ....... *G11B 20/1883* (2013.01); *G06Q 20/127* (2013.01); *G11B 20/1816* (2013.01)

(58) Field of Classification Search
None
See application file for complete search history.

(56) References Cited

U.S. PATENT DOCUMENTS

| 8,174,780 | B1 * | 5/2012 | Tsai | G11B 27/36 360/31 |
| 8,543,757 | B2 | 9/2013 | Gorobets et al. | |
| 8,555,109 | B2 | 10/2013 | Dhuse et al. | |
| 10,748,568 | B1 * | 8/2020 | Chahwan | G11B 21/12 |

(Continued)

OTHER PUBLICATIONS

Li et al., "Reliability Equations for Cloud Storage Systems with Proactive Fault Tolerance", https://www.researchgate.net/publication/329115572_Reliability_Equations_for_Cloud_Storage_Systems_with_Proactive_Fault_Tolerance, IEEE Transactions on Dependable and Secure Computing, Nov. 21, 2018, 13 pages.

(Continued)

*Primary Examiner* — Peter Vincent Agustin
(74) *Attorney, Agent, or Firm* — Anthony England; Andrew D. Wright; Roberts Calderon Safran & Cole, P.C.

(57) ABSTRACT

Systems and methods for proactive transfer of stored data between storage zones to avoid anticipated bit rot are provided. In embodiments, a method includes: determining that one or more quality prediction parameters of a storage zone of a data storage device meet a predetermined threshold for user access or adjacency to another storage zone determined to be unhealthy; and initiating a proactive refreshing of the storage zone based on the determining that the storage zone meets the predetermined threshold, the proactive refreshing of the storage zone including: reading all data in the storage zone; determining that no errors have occurred during the reading of the data; and based on the determination that no errors have occurred, moving all of the data of the storage zone to a new storage zone.

20 Claims, 5 Drawing Sheets

(56) References Cited

U.S. PATENT DOCUMENTS

| | | | |
|---|---|---|---|
| 2002/0103969 A1* | 8/2002 | Koizumi | G06F 3/0653 |
| | | | 711/114 |
| 2002/0184580 A1* | 12/2002 | Archibald, Jr. | G11B 20/1883 |
| | | | 714/719 |
| 2006/0080570 A1* | 4/2006 | Kim | G11B 20/1883 |
| | | | 714/6.13 |
| 2006/0268670 A1* | 11/2006 | Kimura | G11B 7/00736 |
| | | | 369/275.3 |
| 2009/0216936 A1* | 8/2009 | Chu | G06F 12/0246 |
| | | | 711/103 |
| 2011/0002206 A1* | 1/2011 | Akahoshi | G11B 20/1883 |
| | | | 369/47.14 |
| 2011/0280113 A1* | 11/2011 | Berckans | G11B 7/0045 |
| | | | 369/53.2 |
| 2013/0007097 A1* | 1/2013 | Sambe | G06F 3/061 |
| | | | 709/203 |
| 2016/0162208 A1* | 6/2016 | Cai | G11B 20/1889 |
| | | | 711/103 |
| 2018/0246670 A1* | 8/2018 | Baptist | G06F 3/0659 |
| 2019/0034279 A1 | 1/2019 | Trichardt et al. | |
| 2019/0129844 A1 | 5/2019 | Zhang et al. | |
| 2019/0198054 A1* | 6/2019 | Isokawa | G11B 5/09 |
| 2019/0220344 A1 | 7/2019 | Coronado et al. | |
| 2021/0019083 A1* | 1/2021 | Guo | G06F 3/0659 |

OTHER PUBLICATIONS

Mell et al., "The NIST Definition of Cloud Computing", NIST, Special Publication 800-145, Sep. 2011, 7 pages.

* cited by examiner

FIG. 5

PROACTIVELY REFRESHING STORAGE ZONES WITHIN A STORAGE DEVICE

BACKGROUND

Aspects of the present invention relate generally to data storage management and, more particularly, to the proactive transfer of data to avoid anticipated bit rot.

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure. As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

Zone Slice Storage (ZSS) is one mechanism for storing data slices in a data storage environment, wherein most or all new writes are performed in such a way that they are appended to a sequential log. A log may be a file or other section that can be independently accessed within a memory device. A ZSS maintains metadata and data slices relevant to recovering an entire object on a distributed storage network (DSN). The ZSS utilizes a technique called erasure coding, wherein redundant pieces of information are stored in a way that allows recovery from complete storage device failures. Due to the erasure coding nature of a ZSS, a loss of a predefined number of data slices can be tolerated and missing/lost data slices can be restored (rebuilt) from surviving components.

SUMMARY

In a first aspect of the invention, there is a computer-implemented method including: determining, by a data storage device, that one or more quality prediction parameters of a storage zone of the data storage device meet a predetermined threshold for user access or adjacency to another storage zone determined to be unhealthy; and initiating, by the data storage device, a proactive refreshing of the storage zone based on the determining that the storage zone meets the predetermined threshold, the proactive refreshing of the storage zone including: reading, by the data storage device, all data in the storage zone; determining, by the data storage device, that no errors have occurred during the reading of the data; and based on the determination that no errors have occurred, moving, by the data storage device, all of the data of the storage zone to a new storage zone.

In another aspect of the invention, there is a computer program product including one or more computer readable storage media having program instructions embodied therewith. The program instructions are executable by a computing device to cause the computing device to determine that one or more data quality prediction parameters associated with a storage zone of the data storage device meet a predetermined threshold, wherein the one or more data quality prediction parameters indicate anticipated bit decay within the storage zone; and initiate a proactive refreshing of the storage zone based on the determining that the one or more data quality prediction parameters meet the predetermined threshold, the proactive refreshing of the storage zone including: reading all data in the storage zone; determining whether errors have occurred during the reading of the data; in response to determining that errors have not occurred, moving the data of the storage zone to a new storage zone; and in response to determining that errors have occurred, initiating a rebuild of the storage zone, wherein the data is rebuilt in the new storage zone.

In another aspect of the invention, there is system including a processor, a computer readable memory, and one or more computer readable storage media. The system includes program instructions to determine that one or more data quality prediction parameters of a storage zone of the data storage device meet an associated predetermined threshold, wherein the one or more data quality prediction parameters indicate anticipated bit decay of the storage zone; and program instructions to initiate a proactive refreshing of the storage zone based on the determining that the one or more data quality prediction parameters meet the associated predetermined threshold, the proactive refreshing of the storage zone including: reading all data in the storage zone; determining whether errors have occurred during the reading of the data; in response to determining that errors have not occurred, moving the data of the storage zone to a new storage zone; and in response to determining that errors have occurred, initiating a rebuild of the storage zone, wherein the data is rebuilt in the new storage zone. The program instructions are stored on the one or more computer readable storage media for execution by the processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to data storage management and, more particularly, to the proactive transfer of data to avoid predicted bit rot. In embodiments, a data storage device identifies storage zones which may be subject to bit rot, and implements a proactive refresh of the storage zone to move data in the storage zone to a new storage zone. The term bit rot (bit decay, data rot) refers to the slow deterioration in the performance and integrity of data stored on storage media. The term proactive refresh or refreshing as used herein refers to the transfer of data between storage zones (by moving or rebuilding) to address predicted bit rot or data quality deterioration, as opposed to actual bit rot or quality deterioration.

Infrequently accessed media tends to lose strength over time. The redundancy of very randomly accessed (cold) data can slowly deteriorate due to bit rot. In order to prevent this condition, embodiments of this invention identify storage zones in a data storage device which may be subject to bit rot, and implement a proactive refresh of the storage device to transfer all data of the storage zone to a new storage zone. In implementations, a data storage device implements a refresh of stored data when data quality prediction parameters associated with the stored data meet a predetermined threshold. In aspects, proactive refreshing of data is forced on a storage zone that has had no read or write access for a predefined amount of time. During the refresh, the entire storage zone is read, live data is moved to a new location, and the storage zone is released for future allocation. In other implementations, proactive refreshing is forced on a storage zone that is within a predefined distance from another storage zone determined to be unhealthy (e.g., due to read errors). In implementations, if any error occurs in the storage zone, all data slices are dereferenced and a rebuild process is implemented to recreate the data slices in a different location (storage zone) on a storage disk.

Typically, compaction of a storage zone is implemented in order to improve space utilization within a data storage device. Generally, compaction is initiated in a data storage device when an amount of unreferenced or deleted data in the storage zone is greater than a threshold amount. Typically, in the course of compaction, data is read, and the live or remaining data is moved to a new storage zone. If errors occur during the reading of the data, rebuilding of the data may be implemented. Embodiments of the present invention leverage compaction tools to proactively refresh data without the need to meet a threshold of unreferenced data, and/or without the need for actual compaction of the data. Advantageously, implementing proactive refreshing of storage zones according to embodiments of the invention results in faster drive failure discovery, and leads to healthier storage systems and improved data reliability.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
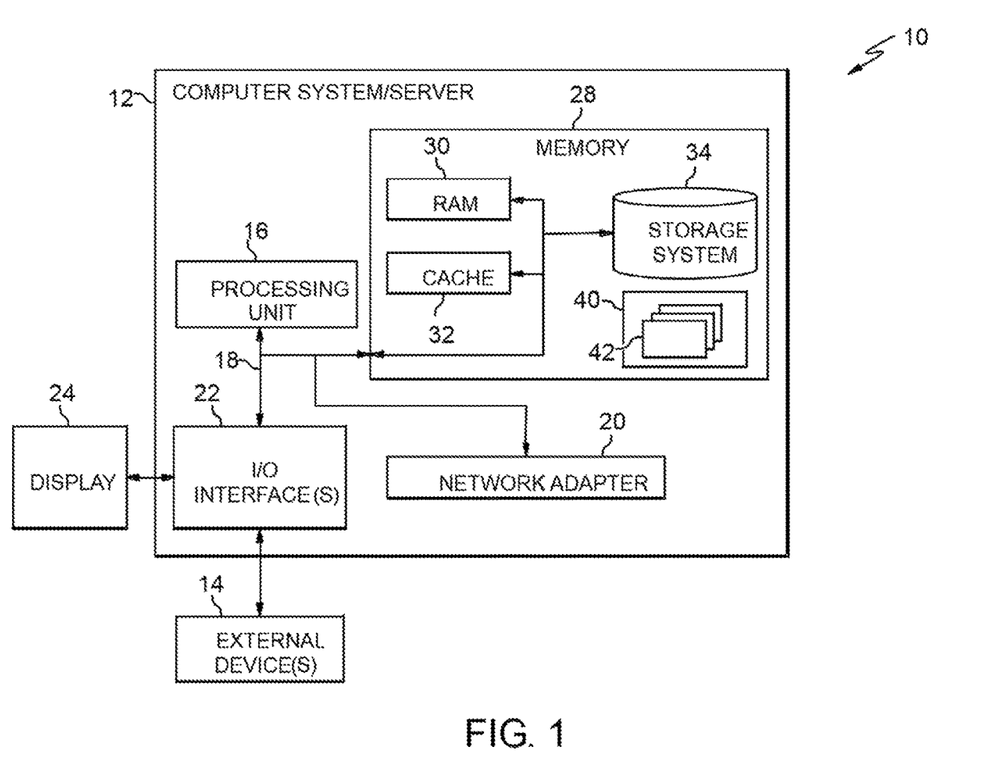
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
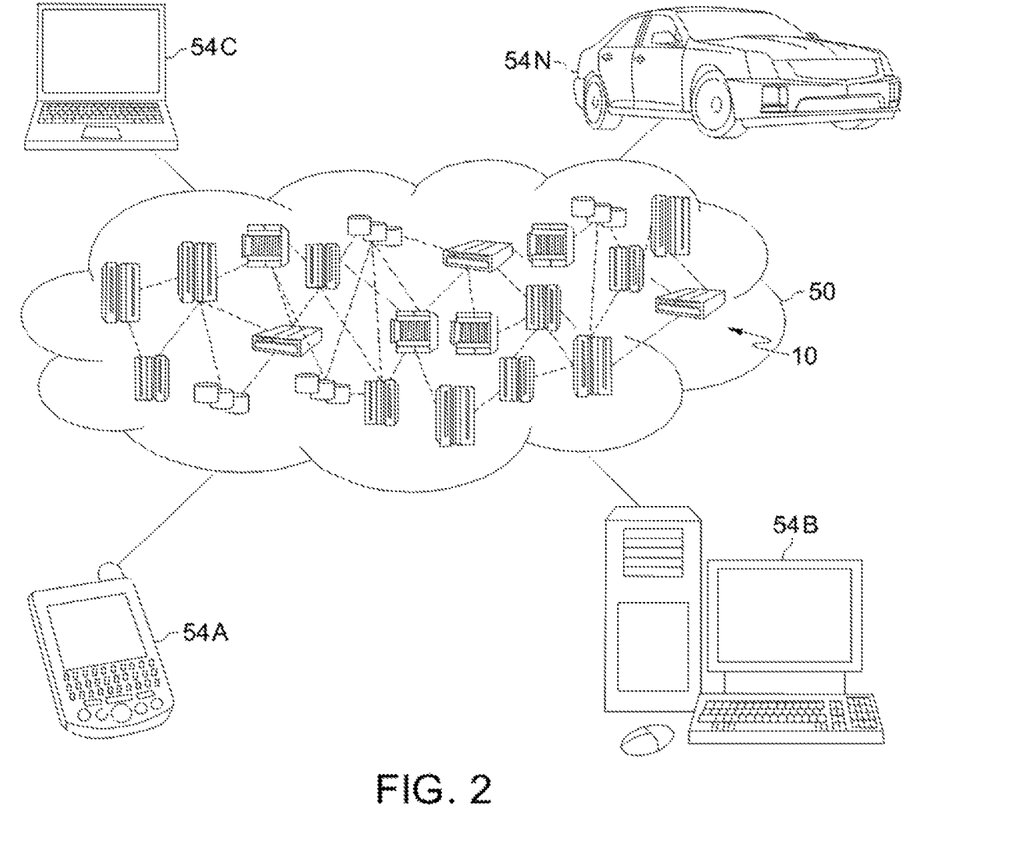
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
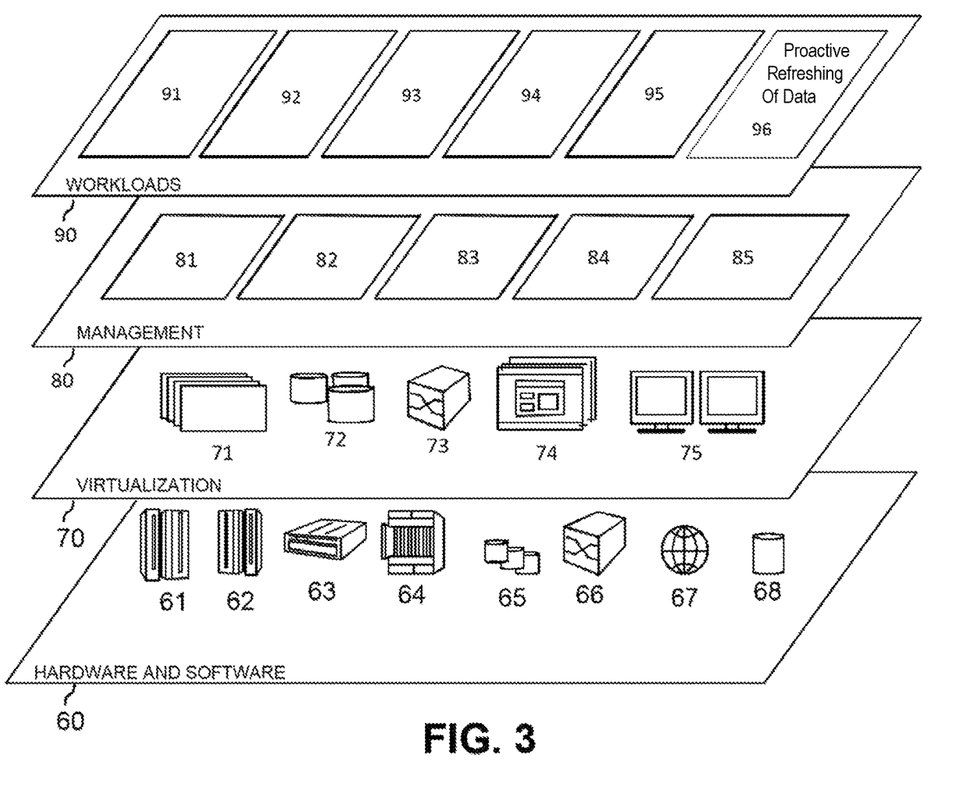
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and proactive refreshing of data 96.

Implementations of the invention may include a computer system/server 12 of FIG. 1 in which one or more of the program modules 42 are configured to perform (or cause the computer system/server 12 to perform) one or more functions of the proactive refreshing of data 96 of FIG. 3. For example, the one or more of the program modules 42 may be configured to: determine whether one or more data quality prediction parameters for a storage zone meet a predetermined threshold value, indicating anticipated bit rot; and initiating proactive refreshing of the storage zone when bit rot is anticipated.

Figure 4:
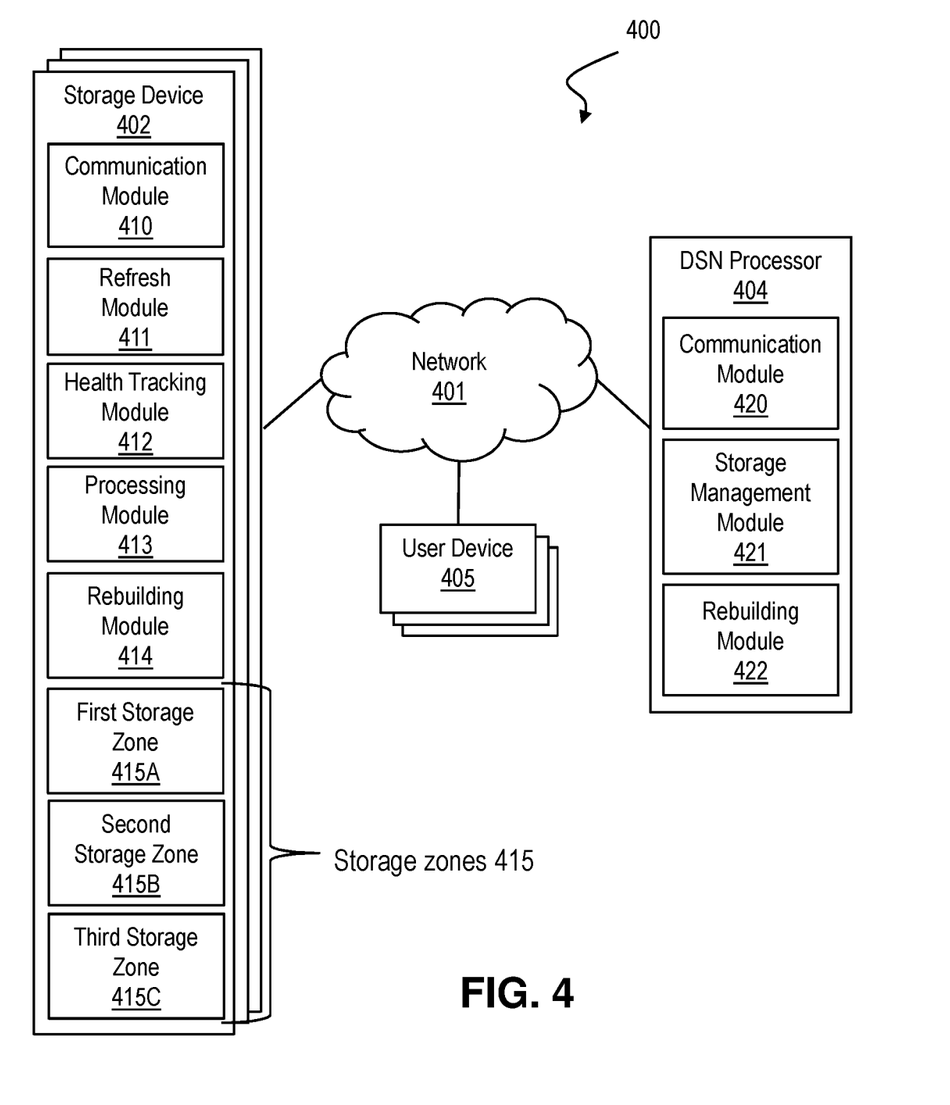
FIG. 4 shows a block diagram of an exemplary distributed storage network (DSN) environment in accordance with aspects of the invention.

FIG. 4 shows a block diagram of an exemplary distributed storage network (DSN) environment 400 in accordance with aspects of the invention. In embodiments, the DSN environment 400 includes a network 401 inter-connecting a plurality of storage devices 402. In embodiments, the network 401 connects the plurality of storages device 402 with a DSN processor 404 and/or one or more user devices 405. The user devices 405 may include components of the computer system 12 of FIG. 1, and may be a desktop computer, laptop computer, tablet, smartphone, or other personal computing device. The DSN processor 404 may also include components of the computer system 12 of FIG. 1, and may comprise a special purpose computing device configured to manage data storage within the DSN environment 400.

The network 401 may be any suitable communication network or combination of networks, such as a local area network (LAN), a general wide area network (WAN), and/or a public network (e.g., the Internet). Each of the storage devices 402 may include components of the computer device 12 of FIG. 1 and may be special computing devices configured to store data within the DSN environment 400. In embodiments, a storage device 402 comprises a ZSS storage device.

Still referring to FIG. 4, each of the storage devices 402 may include one or more program modules (e.g., program module 42 of FIG. 1) executed by the respective storage device 402 and configured to perform one or more functions described herein. For the sake of brevity, only one storage device 402 will be discussed in detail herein. In embodiments, the storage device 402 includes one or more of the following: a communication module 410, a refresh module 411, a health tracking module 412, a processing module 413, a rebuilding module 414, and storage zones 415 (represented by first storage zone 415A, second storage zone 415B, and third storage zone 415C).

In implementations, the communication module 410 is configured to communicate via the network 401 with one or more user devices 405 and/or the DSN processor 404. In aspects, the communication module 410 is configured to send and receive storage instructions, rebuilding instructions, data, or other communications via the network 401 to other devices within the DSN environment 400.

In aspects, the refresh module 411 is configured to: determine whether one or more data quality prediction parameters associated with a storage zone 415 (e.g., first storage zone 415A) of the storage device 402 meet or exceed an associated predetermined threshold value; and selectively initiate proactive refreshing of the storage zone 415 based on the determining. As noted above, the term proactive refresh or refreshing as used herein refers to the transfer of data between storage zones 415 (by moving or rebuilding) to address predicted bit rot or data quality deterioration, as opposed to actual bit rot or quality deterioration. In implementations, the refresh module 411 incorporates and utilizes compaction tools (with or without the actual compaction of data) to implement the transfer of data between storage zones 415. For example, the refresh module 411 may initiate a compaction tool to transfer data from the first storage zone 415A to the second storage zone 415B based a quality prediction parameter meeting a predetermined threshold. In embodiments, the quality prediction parameters comprise real-time parameters regarding one of: parameters regarding user access to the storage zone of interest and/or health data associated with a storage zone adjacent the storage zone of interest. In aspects, the quality prediction parameters change over time due to updated health data and access data of one or more storage zones, and do not constitute static parameters such as predetermined lifespan estimates for a particular storage device or storage zone.

In implementations, the health tracking module 412 is configured to record and monitor the occurrence of errors (e.g., read errors) in stored data, and save resulting health data in a database. In aspects, the health tracking module 412 generates and saves health data based in stored rules (e.g., rules indicated that a threshold number of errors indicates an unhealthy storage area).

In embodiments, the processing module 413 is configured to receive and implement instructions from the refresh module 411. In aspects, the processing module 413 initiates the transfer of stored data between storage zones 415 within a single storage device 402. In implementations, the processing module 413 initiates the transfer of stored data between storage zones of one or more of the multiple storage devices 402 in the DSN environment 400. In embodiments, the processing module 413 sends instructions to a rebuilding module 414 of the storage device 402, or a remote DSN processor 404 (e.g., a communication module 420 of the DSN processor 404), to transfer stored data through rebuilding of the stored data.

In aspects, the rebuilding module 414 is configured to receive instructions to rebuild stored data within a storage zone (e.g., first storage zone 415A) to another storage zone (e.g., second storage zone 415B), and implement the rebuilding of the stored data. The rebuilding module 414 may utilize rebuilding tools and methods to transfer data from a first data zone to a second data zone. In aspects, if a data slice (e.g., data segment) in a first storage zone (e.g., first storage zone 415A) includes an error, it is flagged as a "bad" slice by the refresh module 411. Bad data slices are rebuilt by the rebuilding module 414 using other retrieved encoded data slices that are deemed to be good slices, to produce rebuilt slices. The rebuilt slices are stored in another storage zone (e.g., second storage zone 415B).

In implementations, the storage device 402 includes one or more storage zones 415, represented in FIG. 4 by the first storage zone 415A, the second storage zone 415B, and the third storage zone 415C. In implementations, each storage zone 415 of the storage device 402 is partitioned or otherwise functionally and/or physically separated from other storage zones 415. In implementations, the storage device 402 stores data in a distributed manner in storage zones 415 of different storage devices 402 in the DSN environment 400.

The DSN processor 404 may also include one or more program modules (e.g., program module 42 of FIG. 1) executed by the DSN processor 404 and configured to perform one or more functions described herein. In embodiments, the DSN processor 404 includes one or more of the following: a communication module 420; a storage management module 421; and a rebuilding module 422. In implementations, the communication module 420 is configured to facilitate communication between one or more storage devices 402 and/or user devices 405, and one or more program modules of the DNS processor 404. In aspects, instructions from the storage device 402 can be received by the communication module 420 of the DSN processor 404 to cause the DSN processor 404 to implement the transfer of data between storage zones 415 within the DSN environment 400. In implementations, the communication module 420 of the DSN processor 404 receives instructions from the storage device 402 to initiate the rebuilding of data stored within the DSN environment 400.

In embodiments, the storage devices 402, DSN processor 404 and user devices 405 may each include additional or fewer components than those shown in FIG. 4. In embodiments, separate components may be integrated into a single computing component or module. Additionally, or alternatively, a single component may be implemented as multiple computing components or modules. Additionally, the quantity of devices and/or networks in the DSN environment 400 is not limited to what is shown in FIG. 4. In practice, the DSN environment 400 may include additional devices and/or networks; fewer devices and/or networks; different devices and/or networks; or differently arranged devices and/or networks than illustrated in FIG. 4. Devices of the DSN environment 400 may interconnect via wired connections, wireless connections, or a combination of wired and wireless connections. In implementations, the storage devices 402, DSN processor 404 and/or user devices 405 are nodes 10 within the cloud computing environment 50 of FIG. 2.

Figure 5:
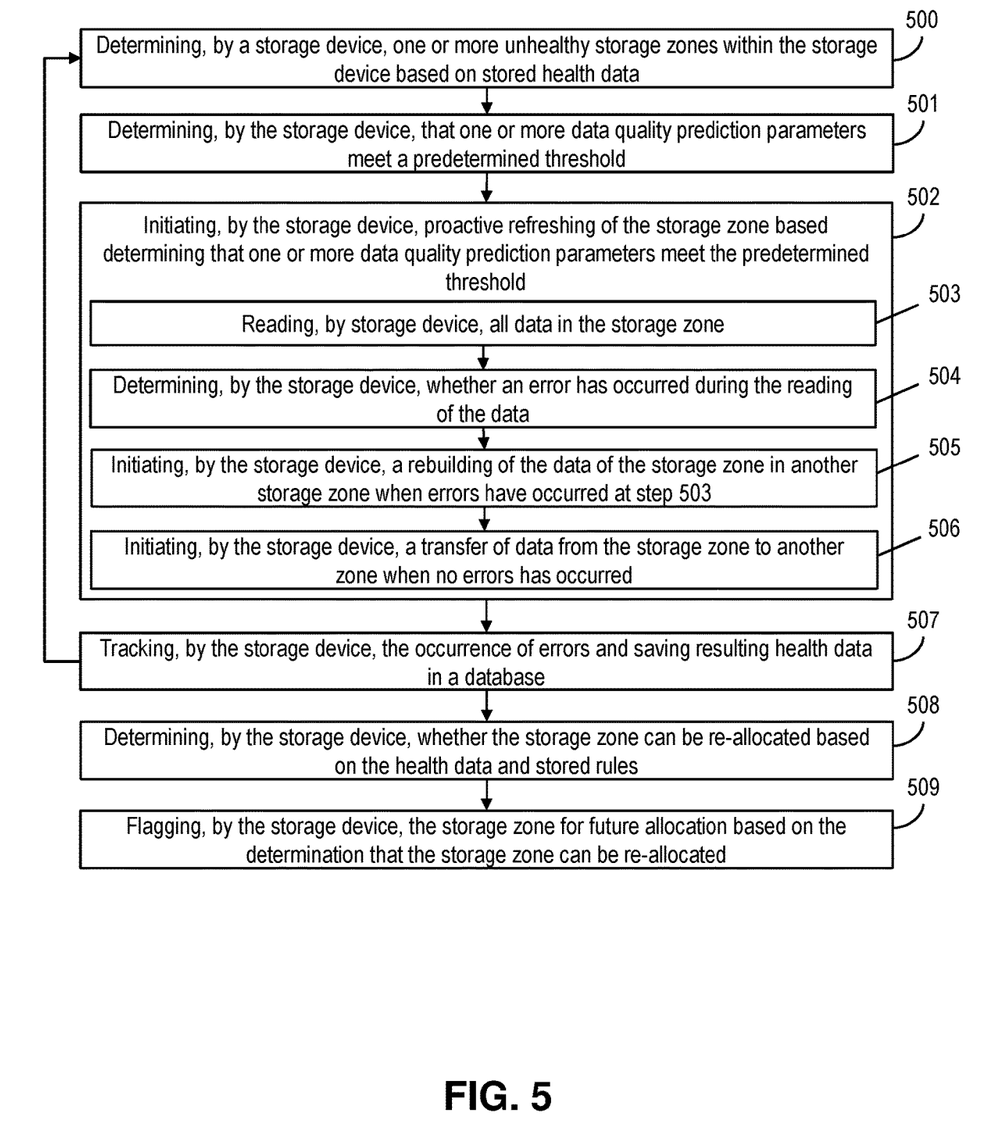
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 500, the storage device 402 determines whether one or more unhealthy storage zones exist within the storage device 402 based on stored health data (e.g., locally stored in the storage device 402). In aspects, the storage device 402 determines whether one or more unhealthy storage zones exist within multiple storage devices 402 of the DSN environment 400 based on stored health data (e.g., locally stored in the storage device 402). In implementations, the stored health data is indicative of the number of errors (e.g., read errors) that have occurred over time for one or more storage zones 415 within the storage device 402, or one or more storage zones within the DSN environment 400 as a whole. In aspects, the storage device 402 determines that a storage zone 415 is unhealthy when the number of errors meets or exceeds a predetermined threshold value. In aspects, the health tracking module 412 of the storage device 402 implements step 500.

At step 501, the storage device 402 determines whether one or more data quality prediction parameters associated with respective storage zones 415 meet or exceed associated predetermined threshold values. Predetermined threshold values may be set by an administrator or user and stored for a storage device 402, and may be different depending on the type of storage zones/storage devices utilized. In implementations, when a data quality prediction parameter for a storage zone 415 (e.g., first storage zone 415A) meets or exceeds the associated predetermined threshold value for that parameter, the storage device 402 determines that a refreshing of the storage zone 415 should be implemented. In embodiments, the data quality prediction parameters are updated in real-time, and comprise parameters regarding user access (e.g., read access) to storage zones 415 of the storage device 402, or parameters indicative of an unhealthy adjacent storage zone 415. It can be understood that close physical proximity of a first data storage zone (e.g., first data storage zone 415A) to an unhealthy data storage zone (e.g., third data storage zone 415C) may result in an increased risk of data deterioration within the first storage zone. Therefore, in embodiments, when a physical distance of a storage zone 415 (e.g., first storage zone 415A) from an unhealthy storage zone (e.g., third storage zone 415C) meets or exceeds a predetermined threshold distance, the storage device 402 determines that the storage zone 415 is at risk to bit rot, and a refreshing of the storage zone 415 is implemented.

With continued reference to step 501, in one example, the storage device 402 determines that at least one data quality prediction parameter associated with the first storage zone 415A meets or exceeds an associated threshold value indicating low user access with respect to the first storage zone 415A. In implementations, data quality prediction parameters include a last modification time of stored dated within a storage zone 415 and/or full storage zone read coverage (e.g., users' read access to the storage zone 415). In another example, the storage device 402 determines that at least one data quality prediction parameters associated with the first storage zone 415 meets or exceeds an associated threshold value when the first storage zone 415A is determined to be within a predetermined distance (physical distance) of another storage zone (e.g., second storage zone 415B) that has been determined to be unhealthy at step 500 (e.g., based on stored health data). In one implementation, the storage device 402 determines whether one or more data quality prediction parameters associated with respective storage zones 415 of multiple storage devices 402 meet or exceed associated predetermined threshold values. In another implementation, the storage device 402 determines whether one or more data quality prediction parameters associated with respective storage zones 415 of a single storage device 402 meet or exceed associated predetermined threshold values. In embodiments, the refresh module 411 implements step 501.

At step 502, the storage device 402 initiates proactive refreshing of a storage zone at issue (e.g., the first storage zone 415) based on the determination at step 501 that one or more data quality prediction parameters meets or exceeds the associated predetermined threshold value. For example, the storage device 402 may initiate a proactive refreshing of the first storage zone 415A when it is determined that the third storage zone 415C is unhealthy, and the first storage zone 415A is within a predetermined threshold distance of the third storage zone 415C. In another example, the storage device 402 may initiate a proactive refreshing of the first storage zone 415A when it is determined that the user read accesses to the first storage zone 415A within a predetermined time period are below a predetermined read access threshold value. In embodiments, the refresh module 411 of the storage device 402 implements step 502.

In implementations, proactive refreshing of the storage zone 415 at issue includes the following substeps. At substep 503, the storage device 402 initiates reading of all data in the storage zone 415 at issue. In embodiments, the storage device 402 implements the reading of locally stored data, while in other embodiments the storage device 402 initiates reading of remotely stored data by another storage device 402.

At substep 504, the storage device 402 determines whether one or more errors have occurred during the reading of the data at issue during substep 503. The storage device 402 may determine one or more read errors have occurred using existing error determination methods and/or tools.

At substep 505, the storage device 402 initiates a rebuilding of the data in the storage zone at issue (e.g., the first storage zone 415A) to another storage zone (e.g., the second storage zone 415B) when the storage device 402 determines at step 504 that one or more errors have occurred during step 503. In implementations, the refresh module 411 of the storage device 402 sends instructions to the rebuilding module 414 of the storage device 402 to rebuild the data in the storage zone of interest (e.g., the first storage zone 415A) when one or more errors in the reading of the data has occurred at step 503. Alternatively, the refresh module 411 of the storage device 402 sends instructions to a remote rebuilding module (e.g., rebuilding module 422) to rebuild data in the storage zone of interest when one or more errors in the reading of the data has occurred at substep 503.

At substep 506, the storage device 402 initiates a transfer of the data from the storage zone of interest (e.g., the first storage zone 415A) to another storage zone (e.g., the second storage zone 415B) when no errors are detected at substep step 504. In implementations, the refresh module 411 of the storage device 402 sends instructions to the processing module 413 of the storage device 402 to move the data from the storage zone of interest (e.g., the first storage zone 415A) to another storage zone (e.g., the second storage zone 415B). Alternatively, the refresh module 411 of the storage device 402 sends instructions to the storage management module 421 of the remote DSN processor 404 to move the data from the storage zone of interest to another storage zone within the DSN environment 400.

At step 507, the storage device 402 tracks the occurrence of any errors determined at substep 504, and saves resulting health data in a database (e.g., a local database of the storage device 402). In implementations, the storage device 402 utilizes the stored health data in the determination step 500 of FIG. 5. In embodiments, the health tracking module 412 of the storage device 402 implements step 507. Data regarding errors may be generated by the storage device 402 and/or may be obtained by the storage device 402 from one or more other storage devices in the DSN environment 400.

At step 508, the storage device 402 determines whether the storage zone at issue (e.g., the first storage zone 415A) can be re-allocated based on the health data and stored rules. In implementations, when the health data indicates more than a predetermined threshold number of errors has occurred, the storage device 402 determines that the storage zone at issue is unhealthy, and flags the storage zone as such. In embodiments, the health tracking module 412 of the storage device 402 implements step 508.

At step 509, the storage device 402 flags the storage zone of interest (e.g., the first storage zone 415A) for future allocation based on a determination at step 508 that the storage zone can be re-allocated. In implementations, when the health data indicates less than a predetermined threshold number of errors has occurred at step 508, the storage device 402 determines that the storage zone at issue (e.g., first storage zone 415A) is healthy and can be re-allocated for use by the storage device 402 (for future data storage). In such situations, the storage device 402 flags the storage zone of interest as a storage zone that may be utilized for future data storage. In embodiments, the health tracking module 412 of the storage device 402 implements step 509.

An exemplary use scenario will now be discussed with reference to FIGS. 4 and 5. In this example, the first storage zone 415A is directly physically adjacent to the second storage zone 415B. In accordance with step 500 of FIG. 5, the health tracking module 412 of the storage device 402 determines that the second storage zone 415B is unhealthy based on storage health data obtained over time according to step 507 of FIG. 5. In accordance with step 501 of FIG. 5, the refresh module 411 of the storage device 402 determines that the data quality prediction parameter (distance) meets or exceeds the predetermined threshold value (a predetermined minimum distance between an unhealthy storage zone and the storage zone of interest) due to the proximity of the first storage zone 415A to the unhealthy second storage zone 415B. Accordingly, the refresh module 411 of the storage device 402 causes the processing module 413 of the storage device 402 to: read the data in the first storage area 415A, and transfer the data from the first storage area 415A to the third storage area 415C (which is allocated for storage). In this example, all live data of the first storage area 415A is transferred to the third storage area 415C without compression of the data. However, in other examples, the transfer of the data from the first storage area 415A to the third storage area 415C may include compression of the data to remove dead or deleted data/spaces. In either case, initiation of the proactive refreshing of the data in the first storage zone 415A is not based on the amount of dead or deleted data/spaces, but is instead based on real-time data quality prediction parameters predictive of bit decay.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In other embodiments, a computer-implemented method comprises: identifying failing media in a zone slice storage (ZSS), wherein the ZSS maintains metadata; performing proactive refreshing (preventative compaction) on a storage zone within the ZSS which has no read access for a predetermined period of time, wherein during the proactive refreshing an entire zone is read, live data is moved to a new location, and the storage zone is released for future allocation; and evaluating whether an error occurs during the read process in the storage zone during the proactive refreshing, if any error occurs in the storage zone, all slices will be dereferenced within the zone and a rebuilding process will be triggered to recreated the storage zone in a different location within the ZSS.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, by a data storage device, that one or more quality prediction parameters of a storage zone of the data storage device meet a predetermined threshold for user access or adjacency to another storage zone determined to be unhealthy;
   initiating, by the data storage device, a proactive refreshing of the storage zone based on the determining that the storage zone meets the predetermined threshold, the proactive refreshing of the storage zone including:
      reading, by the data storage device, all data in the storage zone;
      determining, by the data storage device, that no errors have occurred during the reading of the data; and
      based on the determination that no errors have occurred, moving, by the data storage device, all of the data of the storage zone to a new storage zone; and
   tracking, by the data storage device, occurrences of errors during proactive refreshing of storage zones in the data storage device to produce storage health data.

2. The computer-implemented method of claim 1, further comprising determining, by the data storage device, that the storage zone can be re-allocated after the moving all of the data of the storage zone to the new storage zone, based on the storage health data.

3. The computer-implemented method of claim 2, further comprising flagging, by the data storage device, the storage zone for future allocation based on the determination that the storage zone can be re-allocated.

4. The computer-implemented method of claim 1, further comprising determining, by the data storage device, that the other storage zone is unhealthy based on the storage health data and stored health rules.

5. The computer-implemented method of claim 1, wherein a service provider performs at least one selected from the group consisting of: creates the data storage device, maintains the data storage device, deploys the data storage device, and supports the data storage device.

6. The computer-implemented method of claim 1, wherein proactive refreshing of the storage zone is provided by a service provider on a subscription, advertising, and/or fee basis.

7. The computer-implemented method of claim 1, wherein the data storage device is part of a distributed data storage network and includes software provided as a service in a cloud environment.

8. The method of claim 4, wherein the data storage device determines that the one or more data quality prediction parameters meet the predetermined threshold based on the storage zone being within a predetermined threshold distance of the other storage zone determined to be unhealthy.

9. A computer program product comprising one or more computer readable storage media and program instructions collectively stored on the one or more computer readable storage media, the program instructions executable by a data storage device to cause the data storage device to:
   determine that one or more data quality prediction parameters associated with a storage zone of the data storage device meet a predetermined threshold, wherein the one or more data quality prediction parameters indicate anticipated bit decay within the storage zone; and
   initiate a proactive refreshing of the storage zone based on the determining that the one or more data quality prediction parameters meet the predetermined threshold, the proactive refreshing of the storage zone including:
      reading all data in the storage zone;
      determining whether errors have occurred during the reading of the data;
      in response to determining that errors have not occurred, moving the data of the storage zone to a new storage zone; and in response to determining that errors have occurred, initiating a rebuild of the storage zone, wherein the data is rebuilt in the new storage zone.

10. The computer program product of claim 9, wherein the program instructions further cause the data storage device to track occurrences of errors during proactive refreshing of storage zones in the data storage device to produce storage health data.

11. The computer program product of claim 10, wherein the program instructions further cause the data storage device to determine that the storage zone can be re-allocated based on the storage health data.

12. The computer program product of claim 11, wherein the program instructions further cause the data storage device to flag the storage zone for future allocation based on the determination that the storage zone can be re-allocated.

13. The computer program product of claim 10, wherein the program instructions further cause the data storage device to determine that another storage zone is unhealthy based on the storage health data and stored health rules.

14. The computer program product of claim 13, wherein the data storage device determines that the one or more data quality prediction parameters meet the predetermined threshold based on the storage zone being within a predetermined threshold distance of the other storage zone determined to be unhealthy.

15. The computer program product of claim 9, wherein the data storage device determines that the one or more data quality prediction parameters meet the predetermined threshold based on user access of the data storage device being below a predetermined user access threshold.

16. A system comprising:
a processor, a computer readable memory, and one or more computer readable storage media associated with a data storage device;
program instructions to determine that one or more data quality prediction parameters of a storage zone of the data storage device meet an associated predetermined threshold, wherein the one or more data quality prediction parameters indicate anticipated bit decay of the storage zone; and
program instructions to initiate a proactive refreshing of the storage zone based on the determining that the one or more data quality prediction parameters meet the associated predetermined threshold, the proactive refreshing of the storage zone including:
reading all data in the storage zone;
determining whether errors have occurred during the reading of the data;
in response to determining that errors have not occurred, moving the data of the storage zone to a new storage zone; and
in response to determining that errors have occurred, initiating a rebuild of the storage zone, wherein the data is rebuilt in the new storage zone,
wherein the program instructions are collectively stored on the one or more computer readable storage media for execution by the processor via the computer readable memory.

17. The system of claim 16, further comprising program instructions to track occurrences of errors during proactive refreshing of storage zones in the data storage device to produce storage health data.

18. The system of claim 17, further comprising program instructions to determine that the storage zone can be re-allocated based on the storage health data.

19. The system of claim 17, further comprising program instructions to determine that another storage zone is unhealthy based on the storage health data and stored health rules, wherein the data storage device determines that the one or more data quality prediction parameters meet the predetermined threshold based on the storage zone being within a predetermined threshold distance of the other storage zone.

20. The system of claim 16, wherein the data storage device determines that the one or more data quality prediction parameters meet the predetermined threshold based on user access of the data storage device being below a predetermined user access threshold.

* * * * *